March 30, 1948. H. LONG 2,438,566
SUPPORTING STRUCTURE
Filed March 8, 1943 6 Sheets-Sheet 1
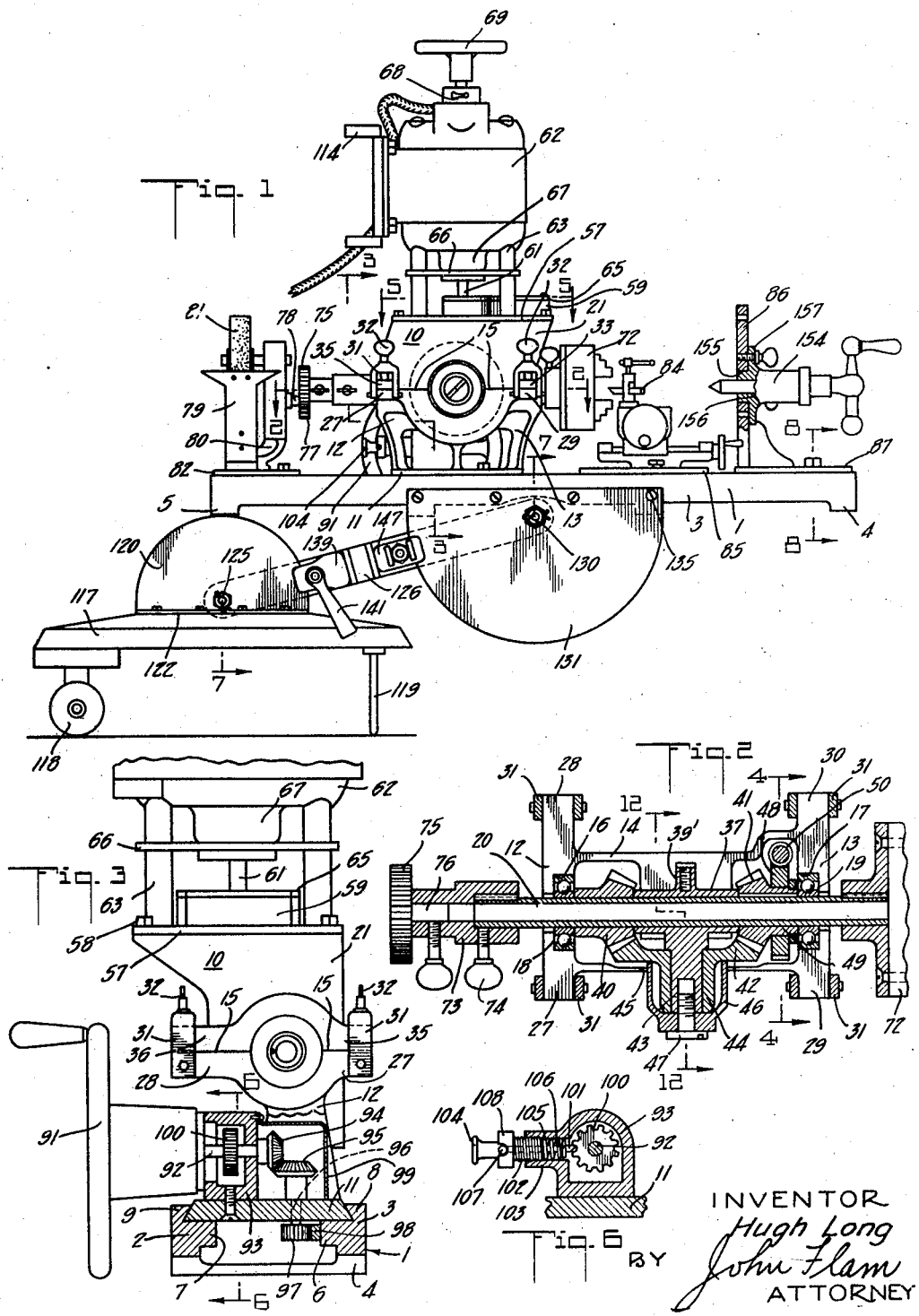

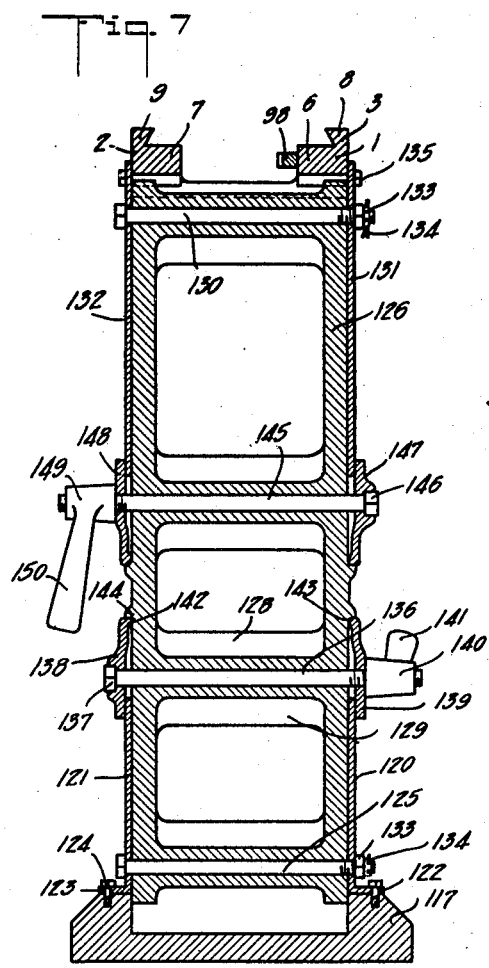
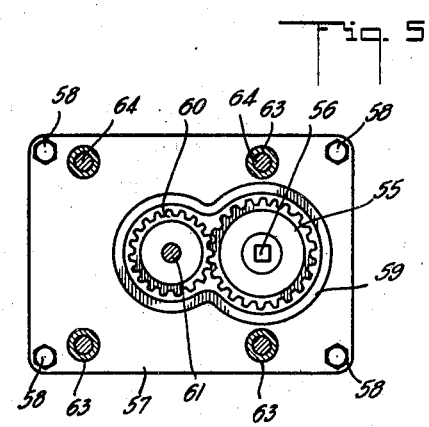
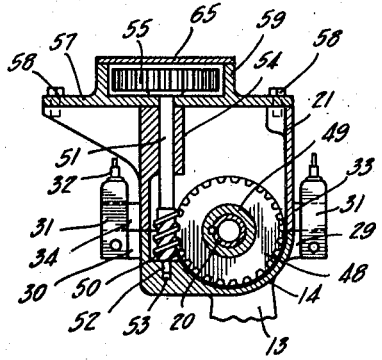
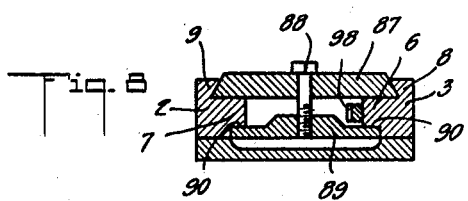

March 30, 1948. H. LONG 2,438,566
SUPPORTING STRUCTURE
Filed March 8, 1943 6 Sheets-Sheet 3
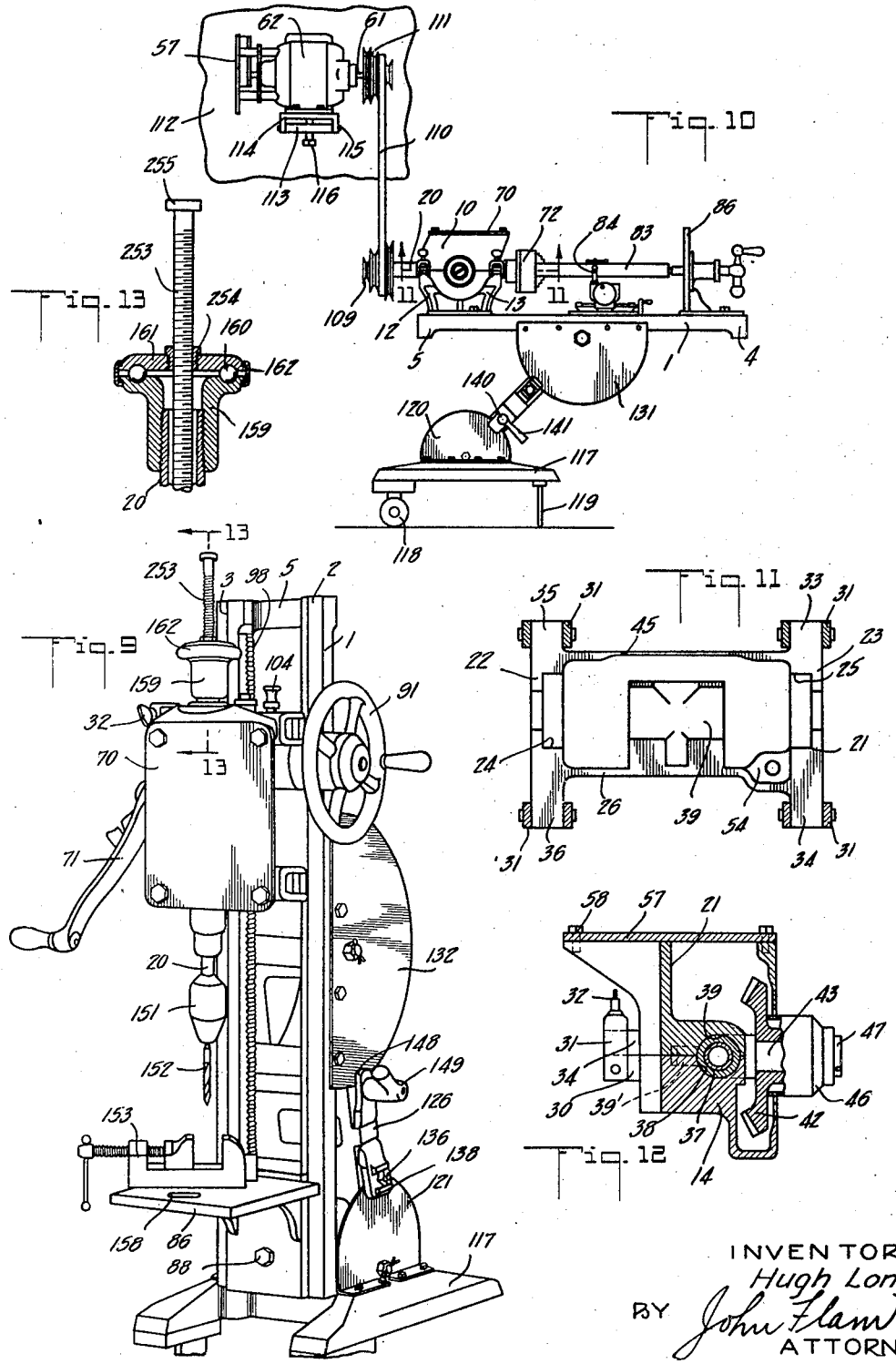
INVENTOR
Hugh Long
BY John Flann
ATTORNEY

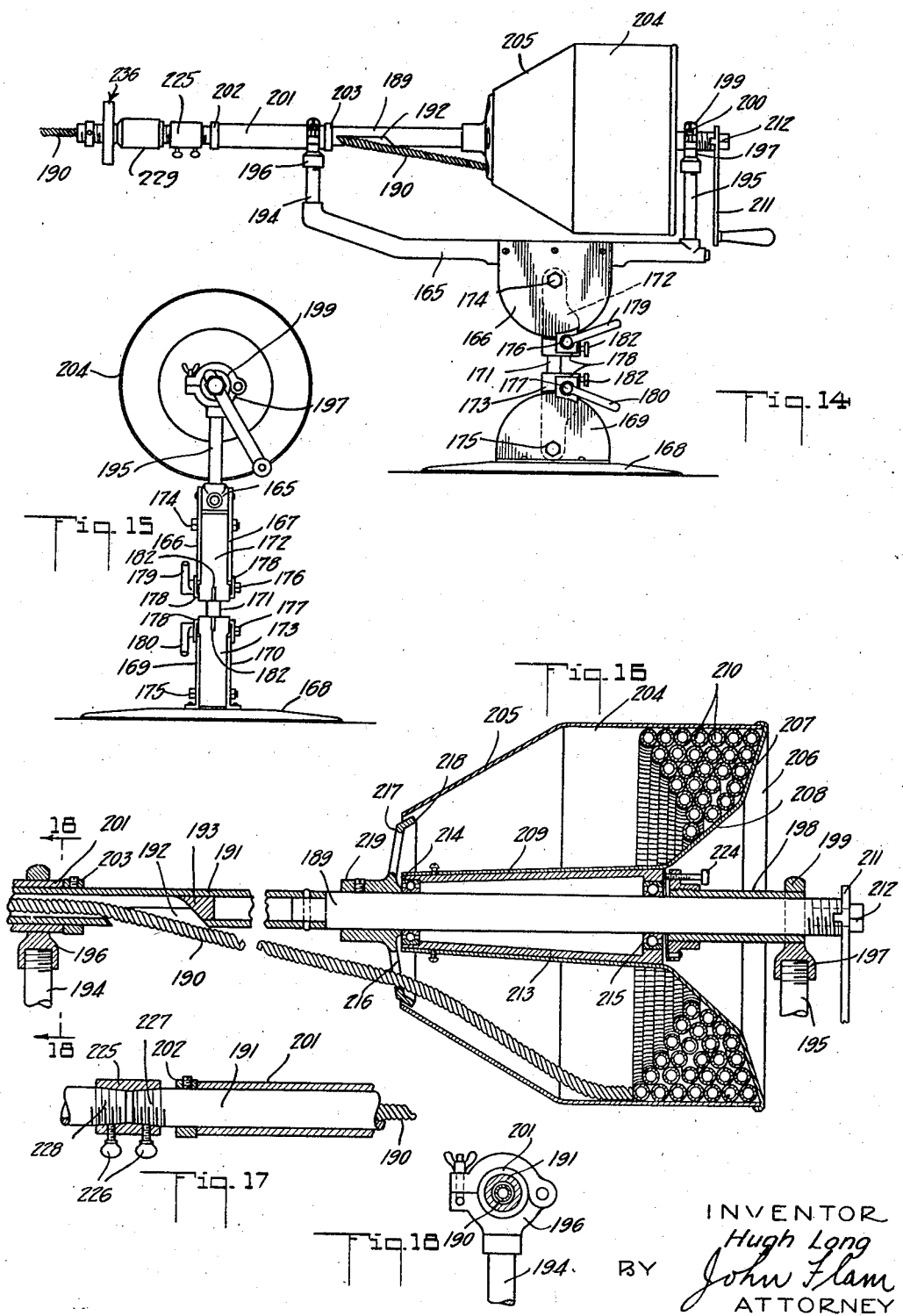

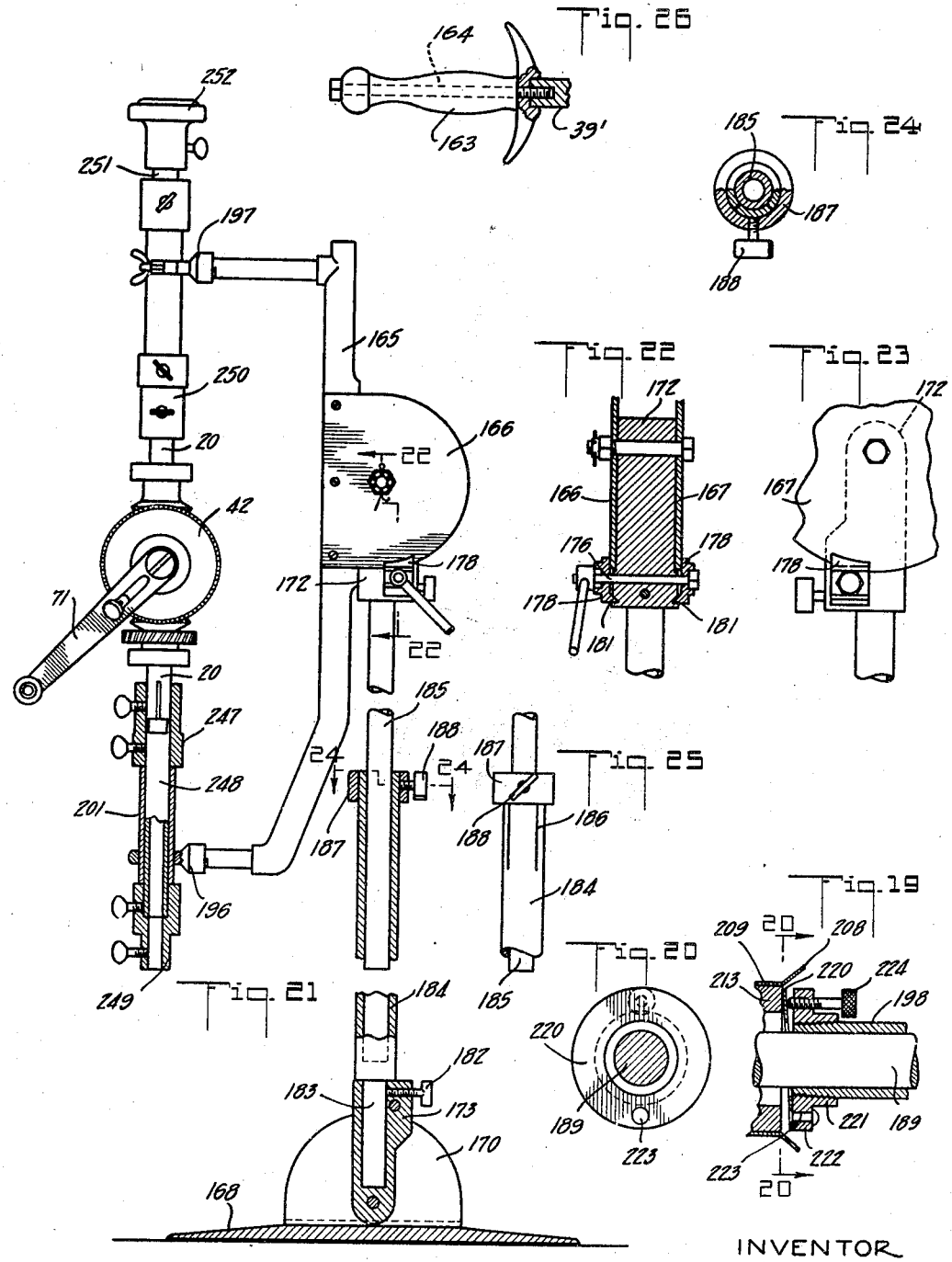

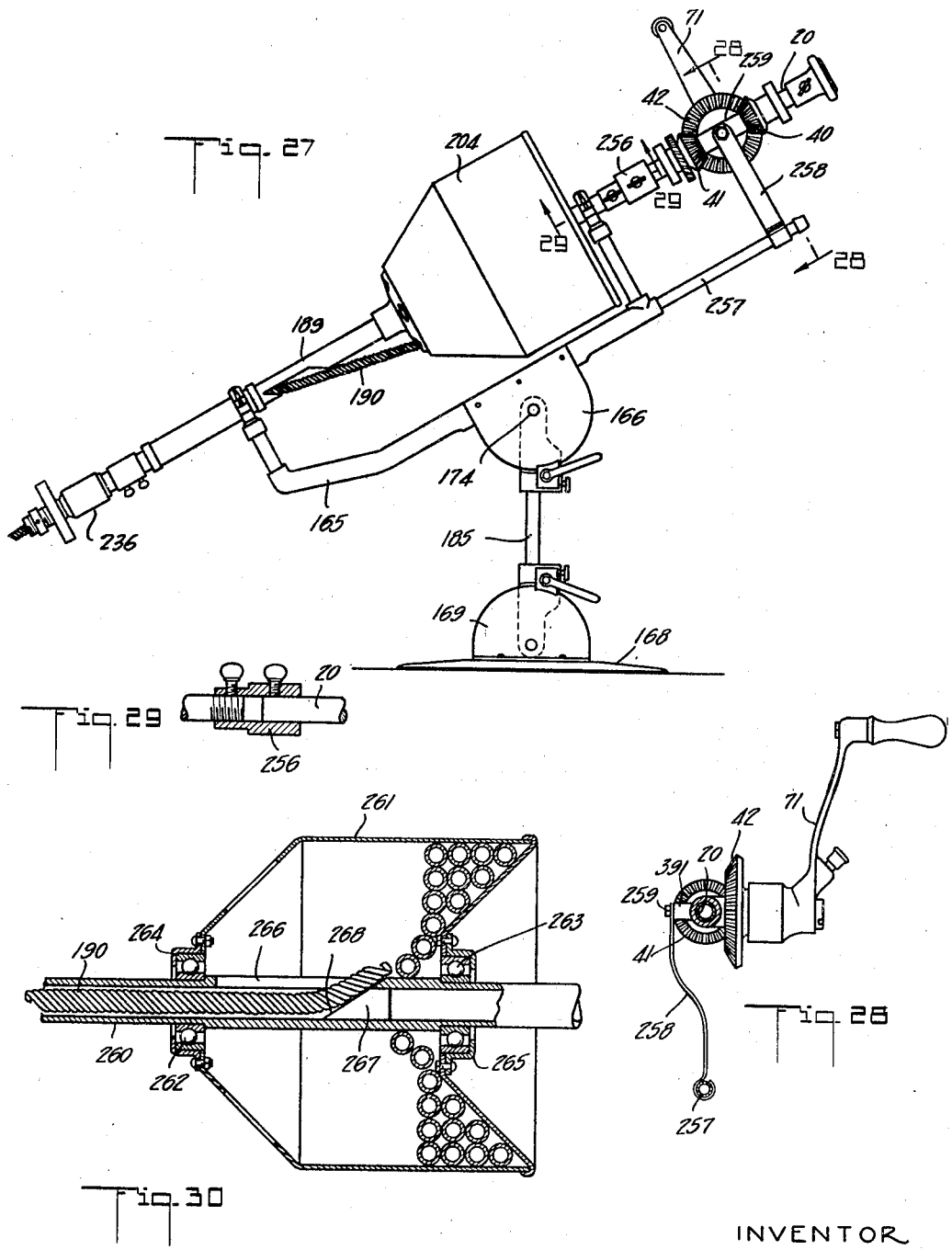

Patented Mar. 30, 1948

2,438,566

UNITED STATES PATENT OFFICE 2,438,566

SUPPORTING STRUCTURE

Hugh Long, Los Angeles, Calif.

Original application July 22, 1939, Serial No. 285,914. Divided and this application March 8, 1943, Serial No. 478,399

11 Claims. (Cl. 248—23)

This invention relates to a universal tool. More particularly, the invention relates to a supporting structure for such a tool whereby a compact light weight portable apparatus is provided, and one that may readily be adapted to be used for a number of purposes. For example, the tool may be used as a lathe or drill press, and a plumber's snake, root borer, or drain cleaner.

This application is a division of an application filed July 22, 1939, under the name of Hugh Long, Serial No. 285,914, for "Universal tool," now Patent No. 2,318,172, granted May 4, 1943.

It is one of the objects of this invention to improve in general the structure and operation of devices of this character.

For adaptation of the tool to various uses, it incorporates a support for a rotary mechanism, as well as a bed for a tool, a tail stock, or the like. The rotary mechanism may support a chuck or any of a variety of other devices. It is another object of this invention to provide a support that may be angularly adjusted in a simple manner, throughout a range from horizontal to vertical, of the axis of the rotary member.

It is still another object of the invention to provide an inexpensive and effective adjustment in height of the apparatus.

In connection with plumber's equipment the efficient use of a "snake" is quite important. Such snakes usually are in the form of a flexible shaft, that may be readily coiled about a support or in a cage, and that may carry at its advancing end an auger or drain cleaner. It is another object of this invention to facilitate the operation of such snakes, and especially by providing a support therefor that can be adjusted to the most convenient position for manipulation of the snake; and to make it possible to exert a large turning moment on the snake while the operator is permitted to assume a comfortable position. This object is attained by the facility of adjustment of the supports angularly, as well as in height.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of my invention, will now be described in detail; but it is to be understood that this detailed description is not to be taken in a limiting sense, since the scope of the invention is best defined by the appended claims.

Referring to the drawings:

Figure 1 is a side elevation of an apparatus incorporating the invention;

Fig. 2 is a sectional view taken along plane 2—2 of Fig. 1;

Fig. 3 is a sectional view taken along plane 3—3 of Fig. 1;

Fig. 4 is a sectional view taken along plane 4—4 of Fig. 2;

Fig. 5 is a sectional view taken along plane 5—5 of Fig. 1;

Fig. 6 is a fragmentary sectional view taken along plane 6—6 of Fig. 3;

Fig. 7 is a sectional view taken along plane 7—7 of Fig. 1;

Fig. 8 is a sectional view taken along plane 8—8 of Fig. 1;

Fig. 9 is a pictorial view of the apparatus shown for use as a drill press;

Fig. 10 is a view similar to Fig. 1, but illustrating another manner of use of the apparatus;

Fig. 11 is a bottom plan view of the cap utilized in connection with the standard illustrated in Fig. 2;

Fig. 12 is a fragmentary sectional view taken along the plane 12—12 of Fig. 2;

Fig. 13 is a fragmentary sectional view taken along the plane 13—13 of Fig. 9;

Fig. 14 is a side elevation of a modified form of the invention;

Fig. 15 is an end elevation thereof;

Fig. 16 is an enlarged longitudinal sectional view of a portion of the apparatus illustrated in Fig. 14;

Fig. 17 is a detailed sectional view illustrating the manner in which certain of the elements of the apparatus of Fig. 14 may be coupled together;

Fig. 18 is a sectional view taken along the plane 18—18 of Fig. 16;

Fig. 19 is an enlarged fragmentary sectional view of a part of the apparatus illustrated in Fig. 16;

Fig. 20 is a sectional view taken along plane 20—20 of Fig. 19;

Fig. 21 is a view similar to Fig. 14 illustrating another manner of use of the apparatus;

Fig. 22 is a fragmentary sectional view taken along the plane 22—22 of Fig. 21;

Fig. 23 is a fragmentary enlarged elevation taken from the right hand side of Fig. 22;

Fig. 24 is a sectional view taken along the plane 24—24 of Fig. 21;

Fig. 25 is a fragmentary elevation of the apparatus illustrated in Fig. 21;

Fig. 26 is a fragmentary view, illustrating a detachable handle mechanism adapted to be utilized with the tool when it is removed from the carriage 10;

Fig. 27 is a view similar to Fig. 14, of a snake operating mechanism, but including reduction gearing;

Fig. 28 is a sectional view taken along plane 28—28 of Fig. 27;

Fig. 29 is a fragmentary sectional view taken along plane 29—29 of Fig. 27; and

Fig. 30 is a fragmentary sectional view similar to Fig. 16, but illustrating a modified form of cage construction.

In general the apparatus includes a bed 1 (Figs. 1, 3, 7, 9 and 10). This bed 1 is quite similar to a lathe bed and may include a pair of slide rails 2 and 3. These rails extend in a parallel direction to form a longitudinal support for a tool carriage to be hereinafter described. They may be joined appropriately at their ends by the cross pieces 4 and 5 (Figs. 1, 3, 9 and 10).

The rails 2 and 3 have inwardly directed flanges 6 and 7, as well as edge flanges 8 and 9. The surfaces of the flanges 6, 7, 8 and 9 define one element of a dovetail connection for supporting the various appliances on the bed in any of a plurality of longitudinally adjusted positions.

Thus, a tool carriage indicated in general by the reference character 10 in Figs. 1 and 3, may be provided with a base 11 (Fig. 3) that is in dovetail connection with the flanges 6, 7, 8 and 9. This carriage 10 may be most conveniently made in the form of a casting, providing the spaced standards 12 and 13 (Figs. 1, 2, 3 and 10). These standards are joined by a tubular-like body 14 (Figs. 2 and 4) and forming a saddle for a removable tool unit, which is illustrated most clearly in Fig. 2.

Thus, for example, the tops of the standards 12 and 13 may be in the form of plane surfaces 15 (Fig. 1) with semi-circular recesses 16 and 17 (Fig. 2) for the accommodation of the outer races of the spaced ball bearing structures 18 and 19. These ball bearing structures provide a rotary support for the hollow spindle or shaft 20 which extends through the inner races of these ball bearing structures.

The spindle 20 is held in the carriage 10 by the aid of a co-operating cap casting 21 shown to best advantage in Figs. 1, 4, 11 and 12. This cap is also provided with plane surfaces 22 and 23 (Fig. 11) adapted to co-operate with the plane surfaces 15. The cap 21 also carries corresponding circular recesses 24 and 25 co-operating with the recesses 16 and 17 to form a complete circular space for the accommodation of the ball bearing structures 18 and 19. Intermediate the end portions of the cap 21 is a hollow body member 26 co-operating with the hollow member 14 of the standard to form an enclosure around the spindle 20. In this enclosure are located the various driving elements, such as gears, etc., that are carried by the tool unit.

In order to hold the cap 21 secured in place and to ensure that the outer races of the ball bearing structures 18 and 19 will be held firmly in the recesses provided in the standards and in the cap, provisions are made for clamping the cap 21 firmly over the standard. Thus, for example, as shown most clearly in Figs. 1, 2, 3, 4, 11, and 12, the standard is provided at each end with the transverse projections 27, 28, 29 and 30. To these projections are hinged the U-shaped clamps 31 embracing the projections and provided with the clamping thumb screws 32. These thumb screws are threaded through the tops of the U-shaped clamps and engage the tops of the corresponding projections 33, 34, 35 and 36 formed integrally with the cap 21. By unscrewing the thumb screws 32 and rotating the clamps 31, the cap 21 may readily be lifted off the standards and the spindle 20 with its associated parts may be lifted off the standard.

The manner in which the spindle 20 may be hand or power driven will now be described. In this connection attention is particularly directed to Figs. 2, 4 and 12. Therein it is seen that the hollow spindle 20 is provided with a supporting sleeve 37. This sleeve is appropriately supported in a cradle or rest provided by the body 14 of the standard 10 and by the hollow body member 26 of the cap 21. The body 14 has a semi-cylindrical cradle 38 accommodating the lower surface of the sleeve 37. Similarly the member 26 of the cap 21 is provided with a semi-cylindrical seat or cradle 39 extending over the top surface of the sleeve 37. The sleeve 37 is provided with a rearwardly extending projection 39 fitting into a recess formed between the cap and the standard for preventing its rotation.

For manual operation of the spindle 20, use is made of a pair of opposed bevel gears 40 and 41 fastened as by keys to the spindle 20. Engaging both of these bevel gears is a driving bevel gear 42. This driving bevel gear is shown as rotatably mounted on a stub shaft 43 integral with the sleeve 37. An appropriate hand operated handle may be provided for the hub 44 of the gear 42. This hub, as shown most clearly in Fig. 2, extends through a clearance aperture 45 in the body 14. When power means are used to drive the spindle 20, however, the hub 44 may be appropriately covered by a cover cap 46 telescoping over the hub 44 and fastened as by a screw 47 to the end of the stub shaft 43.

For power drive, use is made of a worm wheel 48 fastened to the hub 49 of the bevel gear 41 (Figs. 2 and 4). The worm wheel 49 is shown as driven by a worm 50 carried by a vertical worm shaft 51. The lower end 52 of this shaft 51 is shown as mounted in an appropriate recess 53 in the body 14 (Fig. 4). The shaft 51 is further rotatably supported in a journal bearing 54 formed integrally with the cap 21. The upper end of the shaft 51 carries a spur gear 55 (Figs. 4 and 5). This spur gear may be joined to the shaft 51 as by making the top 56 of the shaft non-circular; for example, square. In this way the gear 55 may be readily lifted off the top of the shaft 51 and the worm 50 rotated while wheel 48 is held stationary. The threads on worm 50 will then cause the worm 50 to move upwardly until it is out of contact with wheel 48, when the cap 21 may be taken off the standard.

The cap 21, as shown most clearly in Figs. 4 and 12, is open at the top and is intended to be covered by a cover member 57. This cover member may be fastened to the cap 21 as by the aid of a plurality of screws or bolts 58. The shaft 51 passes through the cover member 57. This cover member furthermore is provided with a vertical wall 59 encompassing the gear 55.

The gear 55 as shown is adapted to be driven by a pinion 60 (Fig. 5) attached to the end of a shaft 61 driven by an electric motor 62 (Fig. 1). This electric motor is appropriately supported directly on the cover member 57, as by the aid of a plurality of upright tubular spacer posts 63. Through these posts pass screws 64 attaching the posts 63 to the cover member 57. The wall 59 extends as well around the pinion 60, as shown most clearly in Fig. 5. A supplemental cover 65 is provided to cover the top of the wall 59 and to enclose the gearing. If desired, an intermediate flange 66 (Fig. 1) may be provided between sections of the spacers 63 upon which the end bracket 67 of the motor 62 rests.

The motor 62 is shown in Fig. 1 as provided with a control switch 68. The shaft 61 may be extended upwardly to carry the handle 69.

Should it be desired to convert from power drive to a manual drive, the supplemental cover 65 is first removed. Then the gear 55 is lifted off the shaft 51. The worm 50 is rotated as before, so that it moves out of engagement with the wheel 48, and then the cover member 57 is removed from the cap 21. In place of the cover member 57 a flat sheet metal cover 70 (Fig. 9) may be substituted. A manually operated ratchet handle 71 may be attached to the hub 44 of the bevel gear 42.

The shaft or spindle 20 is shown in Fig. 2 as carrying at its right hand end a chuck 72 of any appropriate construction, as by being keyed to the spindle 20. Various tools or devices, or the work itself may be clamped by the aid of the chuck 72. The left hand end of the spindle 20 may carry any appropriate power driven device; for example, it may carry a coupling member 73 telescoping over the spindle 20 and keyed thereto. A thumb screw 74 may be utilized to keep the coupling member 73 in place. This coupling member may carry a driving pinion accommodated in the left hand end of the coupling member 73. In the assembly of the device, as illustrated in Fig. 1, this pinion 75 is shown as meshing with a gear 77 mounted on a shaft 78 of a grinder mechanism 79. This grinder mechanism includes a standard 80 and the driven grinder wheel 81, journaled therein. The standard 80 is provided with a plate 82 dovetailed in the rails 2 and 3 for longitudinal adjustment. It may be held in place on the bed 1 of the apparatus in a manner that will be described hereinafter.

The chuck 72 may carry work such as 83 (Fig. 10) adapted to be operated upon by cutting tool 84. This cutting tool is appropriately supported in a conventional tool carriage having a plate 85 also accommodated by the rails 2 and 3 of the bed 1.

In order to provide a tail stock for the rotating work 83, use is made of a bracket 86. This bracket 86 is also provided with a plate 87 accommodated in the rails 2 and 3. This plate 87 is shown to best advantage in Fig. 8. In this figure also a clamping mechanism is illustrated which is adaptable for use in connection with the base 11 of the tool carriage 10 and the plate 82 of the grinder mechanism 79. Thus, for example, a clamping bolt 88 may pass through the plate 87 and may engage a clamping strap 89. This clamping strap has clamping surfaces 90 adapted to cooperate with the lower surfaces of the flanges 6 and 7. By loosening the bolt 88, the tail stock bracket 86 may be adjusted or entirely removed. Similarly, the carriage 10 and the grinder mechanism 79 may be adjusted or removed.

Provisions are made for advancing and retracting the carriage 10 with respect to the bed 1. For this purpose use is made of a rack and pinion mechanism operated by a hand wheel 91 (Figs. 1, 3, and 9). This hand wheel has an axis transverse to the spindle 20. It is provided with a shaft 92 (Fig. 3) journaled in a bracket 93 fastened to the base 11. At its free end the shaft 92 carries a driving bevel pinion 94 meshing with a driven bevel pinion 95. This pinion 95 is shown as carried by a vertical shaft 96 journaled in the base 11 and extending therethrough. At its lower extremity the shaft 96 carries the pinion 97 meshing with a rack 98 that is supported on the inner surface of the rail 3. The gears 94 and 95 may, if desired, be protected by a sheet metal cover member 99 fastened to the bracket 93.

It may at times be desirable to prevent movement of the carriage 10 after it has been moved to an adjusting position by the rotation of hand wheel 91. For this purpose the shaft 92 carries a ratchet wheel 100 (Figs. 3 and 6). Co-operating with this ratchet wheel is a pawl 101. This pawl 101 is in the form of a bar slidably supported within a hollow screw 102. This screw is threaded into the extension 103 of the bracket 93, and it may be provided with a manually operable knob 104. A compression spring 105 abuts the inner end of the screw 102, as well as a collar 106 carried near the end of the pawl 101. In this way the spring 105 constantly urges the pawl 101 into engagement with the wheel 100. In order to withdraw the pawl 101 when desired and to keep it in withdrawn position, the transverse pin 107 is provided for the spindle of knob 104. This pin is shown in Fig. 6 as accommodated in a transverse slot 108 in the head of the screw 102. However, by pulling outwardly on the knob 104, the pin 107 may be released from the slot 108. By turning the knob 104 in one or the other direction, the pin 107 will be placed above the unslotted portion of the head of the screw 102 and the pin will therefore restrain movement of the pawl 101 inward. The pawl is thus rendered ineffective.

Furthermore, if desired, the engaging end of the pawl 101 may be sloping so as to prevent rotation of the shaft 92 in but one direction. By turning the knob 104 through a half revolution, the restraint may be chosen to operate optionally for either of two directions of motion of the carriage 10.

In Fig. 10 the power drive is coupled to the spindle 20 by the aid of a belt transmission. For this purpose, the motor 62 has been removed from the carriage 10, and the sheet metal cover 70 is substituted for the cover plate 57. The spindle 20 is shown as provided with a multiple groove pulley 109, the pulley element having graduated diameters. This pulley structure 109 is engaged by a driving belt 110 which is in driving engagement with a multiple groove pulley structure 111 fastened to the shaft 61 of the motor 62. For this purpose the handle 69 of the shaft 61 (shown in Fig. 1) has been removed.

The manner in which the motor 62 is supported on a wall 112 is also indicated in Fig. 10. Therein it is seen that a bracket 113 is provided on the wall 112. Straddling this bracket is an inverted U-shaped motor supporting member 114 to which the motor frame is attached. This support 114 is pivoted by the aid of the pivot 115 to the edges of the bracket 113 and is preferably permitted freely to swing thereon. An adjusting screw 116 passes upwardly through the bracket 113 to engage the lower surface of the support 114 at a place remote from the axis of the pivot pins 115. In this way the tension of the belt 110 may be adjusted.

As thus far described, the bed 1 of the apparatus is shown as in horizontal position. However, by the aid of the element now to be described, the position of the bed 1 may be adjusted between wide limits both angularly and longitudinally. For this purpose use is made of an adjustable support illustrated most clearly in Figs. 1, 7, 9 and 10.

Thus, a base 117 is shown, which may be permanently attached to a firm foundation; or, if desired, this base may form the top of a dolly for facilitating transport of the tool to desired location. Thus, the dolly may be provided with a pair of rollers 118 at its rear edge and a strut 119 at its front edge. The base 117 is shown as carrying a pair of semi-circular thin disk elements 120 and 121. The centers of these disk elements 120 and 121 are co-axial and are fastened to the top of the base 117 as by the aid of the flanges 122, 123, through which the fastening screws 124 pass. A pivot bolt 125 extends through the common axis of the members 120 and 121. Pivoted on this bolt 125 is an arm or link structure 126. This link structure 126, as shown most clearly in Fig. 7, is provided with the cross ribs such as 128—129. At its free end the link or arm 126 is similarly pivotally joined as by a pivot bolt 130 at the common center of a pair of semi-circular thin disk members 131 and 132. The arm or link 126 is accommodated between these disk elements. The disks 131 and 132 are fastened in co-axial relation to the bed 1, as by the aid of the screws 135. In order to prevent inadverent withdrawal of the pivot bolts 125 and 130, they may be provided with crown nuts 133 and cotter pins 134.

It is apparent that, if no restraint be placed upon relative angular motion between the link 126 and the centers of the disks 120—121 and 131—132, then the bed 1 can be freely moved about the axis of the bolt 130 and the link 126 can be freely moved about the axis of pivot bolt 125 so as to bring the bed 1 in any desired position within the limits of adjustment. It is noted that the disk members 131 and 132 are disposed substantially centrally of the bed 1 so as to provide an adequate support therefor. The bed may, for example, be swung to the vertical position illustrated in Fig. 9, where the apparatus is shown as utilized as a hand driven drill press.

In order to clamp the parts in any desired adjusted position, use is made of clamping mechanism illustrated most clearly in Figs. 7 and 9. Thus, for example, in order to clamp the link 126 against angular movement around the axis of bolt 125, use is made of a clamping bolt 136 that passes through the link 126, on an axis near the edges of the disks. The head 137 of this bolt engages within an appropriate recess in a clamping member 138. This clamping member overlies the edge of the disk member 121. A similar clamp 139 overlies the edge of the disk 120. A tightening nut 140 is threaded on the end of the bolt 136 and is provided with a handle 141 for convenient manipulation. The upper edges of the clamp 138 and 139 are provided with clamping surfaces 142 and 143 engaging opposite sides of the link 126. Shoulders 144 may be provided on the link 126 to co-operate with the upper edges of the clamps 138 and 139 for preventing rotation of these clamps relative to the clamping bolt 136.

Since the clamps 138—139 may be securely pressed against the disk members 120 and 121 adjacent their outer periphery, a sufficiently tight clamping effect is secured to prevent angular motion of the link 126 about the axis of the bolt 125 when desired.

A similar clamping arrangement is provided to restrain angular movement of the bed 1 with respect to the other end of the link 126. Thus, there is a clamping bolt 145 (Fig. 7) which passes through the link 126. The head 146 of this bolt is accommodated in a recess in the clamp 147. This clamp is of the same construction as clamp 138 and overlaps the lower edge of the disk 131. On the other sides of the link 126, a clamp 148 overlies the edge of the disk member 132. A clamping nut 149, provided with a handle 150, is used to tighten the clamps 147 and 148 against the disk members 131 and 132.

Although in Fig. 1 the bed 1 is shown in horizontal position, and in Fig. 9 it is shown in a vertical position, it is apparent that, by appropriate manipulation of the clamping mechanism, the bed 1 may be clamped in any intermediate angular position as desired; and, furthermore, the height of the bed 1 may be adjusted to some extent by adjusting the angularity of the link 126.

In the position of Fig. 9, the apparatus is illustrated as stated heretofore as a vertical hand driven drill press. The spindle 20 is shown as supporting a conventional drill chuck 151 in which the shank of a twist drill 152 may be clamped. By rotation of the hand wheel 94, the drill 152 can be advanced or retracted from the work supported by the aid of the bracket 86. This bracket 86 serves optionally to support the tail stock illustrated in Fig. 1, or a work clamp 153 illustrated in Fig. 9. As shown most clearly in Fig. 1, the bracket 86 accommodates the tail stock structure 154 as by the aid of an aperture 155 co-axial with the axis of rotation of the spindle 20. The tail stock structure 154 has a cylindrical support 156 telescoping into the aperture 155. The flange 157 surrounds the cylindrical support 156. By the aid of this flange the tail stock structure 154 may be supported on the bracket 86.

The bracket 86 is also provided with a plurality of transverse slots, such as shown at 158 in Fig. 9. By the aid of these slots, clamping bolts may be passed through the bracket 86 to hold the work holder or vise 153 in place.

When the spindle 20 is to be rotated by manual power, as, for example, when the apparatus is to be used as a hand driven drill press as illustrated in Fig. 9, the upper end of the spindle 20 may be provided with a steadying handle. This construction is illustrated in Fig. 13. Thus the spindle 20 is shown as having threaded thereon a flanged sleeve 159 forming the lower race for a series of balls 160. The upper race is formed in a cap 161. Accordingly the cap 161 may be held by the hand without interfering with the rotation of spindle 20 and the sleeve 159.

In order to prevent axial separation of the ball races, use may be made of a relatively loose sheet metal ring 162, the edges of which may be turned inwardly so as to co-operate with the edges of the sleeve 159 and the cap 161.

The manually operated spindle 20, with the handle structure just described, may with its associated parts be removed from the carriage 10, and may be used as an ordinary brace bit. In order to make it possible conveniently to hold the brace bit, use may be made of a handle structure such as illustrated in Fig. 26. This handle structure includes the usual handle 163. Through the handle passes a bolt 164 adapted to be tapped into the stub shaft 39' that is illustrated in Fig. 2.

The brace bit structure illustrated in Figs. 9 and 13 is so arranged that it may be removed from carriage 10 and utilized between parallel surfaces, as, for example, for drilling through spaced beams or studding. In order to provide a rest for the brace against one of the surfaces, use may be made of a jack screw 253 threaded into the nut 254 disposed in the handle member 161. By turning the jack screw 253 in and out of the handle, its head 255 may be made to engage the adjacent surface.

The manner of operation of the apparatus just described is apparent from the foregoing. The device may be used as a wood or metal lathe. It may also be used as a drill press, either hand or power driven. If desired, various appliances exemplified by the grinding wheel structure 79 may be supported on appropriate brackets dovetailing with the rails 2 and 3 of the bed 1, and may be arranged to be driven through appropriate connections from the spindle 20.

The adjustable support for the bed makes it possible to utilize a tool for a large variety of purposes. For example, as illustrated in Figs. 14 to 18, this type of standard may be effectively used in connection with the operation of a plumber's snake. Instead of the conventional lathe bed, a single bar support 165 may be provided which carries the clamping semi-circular disks 166 and 167. This base 168 carries corresponding semi-circular clamping disks 169 and 170. As before, a link 171 is pivotally mounted at its opposite end in the axes of the disk structures 166—167 and 169—170, whereby the angle and height of the support 165 may be adjusted. The clamping mechanism to hold the apparatus in adjustment is quite similar to that already described. It is shown to best advantage in Figs. 14, 15, 21, 22 and 23. Thus the link 171 may be provided at its opposite ends with the clevises 172 and 173, which enter between the spaced clamping disks 166—167 and 169—170. The pivot bolts 174 and 175 pass through these clevises. The clevises also carry the clamping bolts 176 and 177. These clamping bolts also pass through the clamps 178 overlapping the edges of the corresponding disk member and tightened against them by manipulation of the handle nuts 179—180. Any appropriate device may be utilized for preventing rotation of the clamps 178 about the axis of the corresponding clamping bolt, such, for example, as dowel pins. The head of the bolts 176 and 177 may be accommodated in a groove formed in the corresponding clamping member 178 to prevent the clamping bolt 176 from turning. As shown most clearly in Fig. 22, each of the clamps 178 may be provided with a knife edge 181, co-operating with a groove in the corresponding clevis 172 or 173.

The operation of the adjustable standard is substantially identical with that illustrated in Fig. 1. However, provisions are made whereby the length of the link structure joining the base 168 to the support 165 may be adjusted. As shown in Fig. 14, the clevises 172 and 173 may be slidably accommodated on the intermediate pipe member 171. The thumb screws 182 may be used to clamp the clevises in any angularly adjusted position on the intermediate member 171.

If a greater height is desired, provision may be made to form a telescoping joint that may be adjusted for height. Such an arrangement is illustrated in Figs. 21, 24, and 25. In this form the clevis 173 is shown as accommodating a post 183 joined to the hollow tubular member 184 of any desired length. Telescoping within the tube 184 is a rod 185 joined to the upper clevis 172.

In order to hold the two telescoping members 184 and 185 in any adjusted position, the upper end of the tubular member 184 is arranged to be compressed around the rod 185. For this purpose the upper end of the tubular member 184 is shown as slotted as at 186 (Fig. 25). A collar 187 may be joined at one point to the top of the member 184. At a diametrically opposite point a clamping screw 188 may be provided for tightening the member 184 around the rod 185.

The support 165 is shown in Figs. 14 and 15 as providing a rotatable support for a snake spindle 189. This spindle is shown as being made up of a hollow front portion 191 into which the snake 190 may project to pass outwardly in the front of the apparatus, as illustrated in Fig. 14. For this purpose the hollow portion 191 is shown as provided with a slot 192. Adjacent the slot opening a tapered plug 193 may be inserted in the hollow member 191 to guide the snake 190 into the slot.

The manner in which the snake 190 may be clamped in the snake spindle 189 will be described hereinafter.

The supporting bearings for the spindle structure 189 include the upright posts 194 and 195 projecting from support 165. These posts are shown as threaded into the half-round seats 196 and 197. Disposed in the half-round seat 197, attached to post 195, there is a journal sleeve 198. This sleeve 198 is clamped firmly in its seat by the aid of a cap 199 pivoted at one side to the seat member 197. A clamping thumb screw 200 serves to hold the cap 199 firmly in place. The spindle 189 is journaled within the sleeve 198.

Similarly, the seat 196 at the left hand end of the apparatus firmly holds a bearing sleeve 201. In order to restrict axial movement of the spindle 189 with respect to the bearings, the hollow portion 191 may carry the spaced collars 202 and 203 adjacent the opposite ends of the bearing sleeve 201.

The snake 190 is arranged, as is well understood, to carry appropriate tools at its free ends, such as augers or drain cleaners or reamers, or the like. It is necessary that the unused portion be properly maintained in a reservoir space, as for example a snake cage. Such a cage 204 is illustrated in the present instance as mounted co-axially with the spindle 189. It may be in the form of a sheet metal member having a conical portion 205 and a rear wall 206. This rear wall 206 is so formed as to provide an interior annular space defined by the conical walls 207 and 208. A re-entrant sleeve-like portion 209 forms the inner wall of the annular space. As indicated most clearly in Fig. 16, the snake 190 is shown as joining a plurality of convoluted turns 210 within the cage 204.

The manner in which the cage 204 is supported by the aid of the re-entrant sleeve 209 upon the spindle 189 will be hereinafter described. The spindle 189 is shown as capable of manual rotation, as by the aid of a handle structure 211 attached to the right hand end of the spindle 189, as by the aid of a screw 212. During the rotation of spindle 189, the snake 190 is also rotated, since the snake may be clamped by the aid of a chucking device. During this rotation, provision should be made to permit the cage 204 to rotate also. For this purpose the re-entrant sleeve 209 carries a tapered elongated tubular bearing supporting member 213. This member 213 surrounds the spindle 189 and carries the outer races of a pair of spaced ball bearing structures 214 and 215. The inner races of these ball bearing structures are supported directly upon the spindle 189. The snake is passed into the cage 204 through any one of a number of apertures 216 provided in a flange 217. This flange 217 has a lip 218 extending beneath the open edge of the cage 204. The flange 217 is provided with a hub 219, by the aid of which it may be fastened to the spindle 189.

The manipulation of the snake 190 under various conditions may involve an advancement or retraction of the snake 190 through the hollow member 191. Under such circumstances the snake should be free to coil and uncoil within the cage 204. The provision of the bearing structures 214 and 215 permits the cage 204 to rotate to the proper extent to accomplish this coiling or uncoiling of the snake 190. If desired, however, the free rotation of the cage 204 about the spindle axis may be restrained as by a braking arrangement. Such a braking arrangement is illustrated most clearly in Figs. 16, 19, and 20. It may include a flexible brake disk 220 adapted to be urged against the right hand surface of the bearing support member 213. The disk 220 encompasses the spindle 189 and is supported by the aid of the bearing sleeve 198. For example, this bearing sleeve may support a threaded collar 221 having a flange 222. A rivet or other fastening device 223 passes through the flange 222 and the disk 220. Diametrically opposite the place where the disk 220 is joined to the flange 222, means are provided for flexing the disk 220 against the member 213. For example, a thumb screw 224 may be provided for this purpose. This thumb screw is threaded through the flange 222. It may be adjusted to provide the desired pressure against the brake disk 220.

In some instances it may be desirable to clamp the snake 190 within the spindle 189. A suitable clamping chuck structure is provided for this purpose at the left hand end of the spindle, as indicated by the numeral 236 (Fig. 14).

The chuck structure 236 may be coupled to the hollow portion 191 of the spindle 189 by the aid of a pipe union 225 (Fig. 17). This pipe union may be provided with a pair of thumb screws 226. These thumb screws engage respectively the pipe threads 227 on the end of the extension 191 and the pipe threads 228 formed on the body 229 of chuck 236. The snake 190 passes through the body 229 and is appropriately clamped to the body.

The operation of the snake mechanism illustrated in Fig. 14, especially when it is mounted upon the extension stand illustrated in Fig. 21, may be now set forth. When it is desired, for example, to clean out a drain, the height of the standard may be adjusted for maximum convenience, the spindle being appropriately directed toward the drain. A portion of the snake is then inserted in the drain, and a generally axial motion imparted to the snake by swinging the entire mechanism about bolts 174 and 175, the clamp handles 179 and 180 being loose so as to permit such movement readily. At the same time the snake may be rotated by operation of handle 211, it being assumed that the chuck structure is out of gripping relation with the snake. Alternatively, the chuck structure can be operated to clamp the snake 190 while the to-and-fro motion of the snake mechanism is effected.

The support 165 with the adjustable standard may be utilized as illustrated in Fig. 21 for supporting a bit brace. The angular position of the manually operated bit brace may be adjusted as heretofore described in connection with the form of the invention illustrated in Fig. 1. This bit brace may be the same as that utilized in the tool carriage 10. The cover 46 for the hub 44 of gear 42 (Fig. 2) is, however, removed, and an operating handle and ratchet mechanism 71 is substituted for rotating the bevel gear 42. Furthermore, the hollow spindle 20 may be provided with extensions for co-operating with the seats 196 and 197. Thus the lower end of the spindle 20 may carry the coupling 247 for the spindle extension 248. The lower end of this spindle extension may be provided with a supplemental coupling 249 adapted to carry a tool, or the like. Similarly, at the upper end of the spindle 20, a coupling member 250 is utilized for the spindle extension 251. A hand grip 252 may be coupled to the upper end of the extension. This handle may be of the same general character as illustrated in Fig. 13.

At times an increased turning moment is needed to be applied to the snake 190. Under such circumstances a supplemental reduction gearing may be effectively employed in connection with the snake mechanism. As illustrated most clearly in Figs. 27 and 28, for this purpose use may be made of the brace bit gearing and the hollow spindle 20. Thus the handle structure 211 (Fig. 14) is removed from the end of the spindle 189. This threaded end of the spindle may then be coupled as by coupling member 256 (Fig. 29) to the hollow spindle 20 of the brace bit, including the ratchet handle 71.

In order to provide a firm support for the brace bit structure, a pipe 257 is threaded into the horizontal portion of the support 165 to serve as an extension thereof. Projecting from this member 257 is a brace rod 258 fastened as by the aid of the screw 259 into the stub shaft 391 of the brace bit.

The reduction gearing afforded by the bevel gear 42 and the co-operating bevel gears 40 and 41 of the brace bit makes it possible to exert a much greater turning moment upon the snake 190.

Another form of snake cage and support is illustrated in Fig. 30. The snake 90 in this form passes through a hollow spindle 260 corresponding to the spindle 189 of the form shown in Fig. 14. The cage 261 is shown as rotatably supported upon the spindle 260 by the aid of the ball bearing structures 262 and 263, respectively, at the left and right hand portion of the cage structure. The inner races of these ball bearing structures are shown as accommodated on reduced portions of the spindle 260, and as abutting against shoulders formed thereon. The outer races are accommodated in the flanges 264 and 265 carried by the cage 261. The snake 190 passes through an elongated slot 266 of the spindle 260. This slot 266 is located in such a manner that the snake 190 passes through the slot 266 directly into the inside of the cage 261. A plug 267 with a sloping face 268 may be located within the spindle 260 adjacent the right hand end of the slot 266 for guiding the snake 190 in a proper direction as it enters the cage 261. The manner of use and the supporting of the spindle 260, however, may be substantially identical with that described in connection with the form illustrated in Fig. 14.

What is claimed is:

1. In a device of the character described, a tool support, a pair of concentric, axially spaced arcuate members fastened to the support, another pair of concentric, axially spaced arcuate members, an arm extending from between one pair of members to between the other pair of members and pivotally joined to them respectively at their axes, for permitting angular adjustment of the arm with respect to the pairs of members about their axes, said second pair of members thereby serving as a mounting for the arm, and clamping means carried by the arm and adapted to engage said members.

2. In a device of the character described, a tool support having a longitudinally extending member, an arm pivotally joined at one end to the support and approximately centrally with respect to the ends of the member, and means forming a pivotal mounting for the other end of the arm, said arm comprising a pair of telescoping members and means for clamping the members in adjusted telescopic position.

3. In a device of the character described, a base, a link support pivotally supported by said base, means for restraining said link support against angular motion about its pivot, a tool support pivotally mounted on top of the link support, about an axis parallel to the axis of the link support pivot on the base, and means for restraining said tool support against angular motion about its pivot, each of said restraining means comprising, means for creating friction between said base and said link support and a member for optionally operating said means, carried by said support and spaced radially from the pivot.

4. In a device of the character described, a pair of parallel spaced members, a link support angularly movable between the members, means for urging said member against the sides of the link support for optionally restraining said link support from angular movement, a supporting structure having a second pair of parallel spaced members and pivoted between said second pair of an axis parallel to the axis of the angularly movable link support, and means for urging said second pair of members against the sides of the link support for optionally restraining angular movement of said supporting members.

5. In a universal tool, an arm, means to which said arm is pivotally attached, a member secured to said means and having an arcuate edge curved about the pivot, and clamp means acting adjacent said edge for urging said member and said arm together to prevent relative motion between the first mentioned means and the arm.

6. In a universal tool, including a base, a tool support, and an arm pivotally secured at its opposite ends to said base and tool support respectively, arcuate plates respectively secured to said base and said tool support co-axially with the pivots of the arm, and clamp means for optionally urging the edge portion of each plate into contact with the arm to maintain the arm in adjusted position with respect to the base and/or the tool support.

7. In an adjustable supporting structure, a support, a pair of concentric, axially spaced arcuate members fastened to the support, an arm extending from between said pair of members and pivotally joined to them at their axis, for permitting angular adjustment of the arm with respect to said pair of members, and clamping means carried by the arm and adapted to engage said members adjacent their peripheries for urging said members toward each other and into contact with the arm.

8. In a device of the character described, a tool support, a pair of concentric, axially spaced arcuate members fastened to the support, another pair of concentric, axially spaced arcuate members, an arm extending from between one pair of members to between the other pair of members and pivotally joined to them respectively at their axes, for permitting angular adjustment of the arm with respect to the pairs of members about their axes, said second pair of members thereby serving as a mounting for the arm, and clamping means carried by the arm and adapted to engage said members on their sides adjacent their peripheries.

9. In a universal tool, means forming a base, a member mounted on said base and having an arcuate edge, an arm supported on the base for movement about the axis of said arcuate edge, and clamp means carried by said arm adapted to engage said member adjacent its edge and to urge the edge portion of said member and said arm together with sufficient force to prevent relative movement between the member and the arm.

10. In a universal tool, means forming a base, a member mounted on said base and having an arcuate edge, an arm supported on the base for movement about the axis of said edge, clamp means carried by said arm adapted to co-operate with the edge portion of said member to prevent movement of the arm about said axis, a tool support pivotally carried by the arm, and additional clamp means to restrict pivotal movement of the tool support on said arm.

11. In an adjustable supporting structure, an arm member and a supporting member, means pivotally securing said members together, one of said members having a plate with an arcuate edge curved about said pivotal means, and clamp means carried by the other member for urging said members together to prevent relative movement therebetween, said clamp means comprising a clamp member swingably carried by said other member and having a portion adapted to engage the surface of said plate against the arcuate edge, whereby to confine the plate against said other member, and means for urging said clamp toward said other member.

HUGH LONG.

REFERENCES CITED

The following references are of record in the file of this patent:

UNITED STATES PATENTS

| Number | Name | Date |
|---|---|---|
| 185,682 | Johnson | Dec. 26, 1876 |
| 221,862 | Putnam | Nov. 18, 1879 |
| 1,338,555 | Cook et al. | Apr. 27, 1920 |
| 1,540,720 | Buckbee | June 2, 1925 |
| 1,684,325 | Lister et al. | Sept. 11, 1928 |
| 2,138,600 | Harmon | Nov. 29, 1938 |
| 2,269,160 | Morrill | Jan. 6, 1942 |
| 2,281,769 | Hochriem | May 5, 1942 |

FOREIGN PATENTS

| Number | Country | Date |
|---|---|---|
| 848,742 | France | Nov. 6, 1939 |